United States Statutory Invention Registration [19]

[11] Reg. Number: H670

Kimura et al.

[43] Published: Sep. 5, 1989

[54] HERBICIDAL COMPOSITION

[75] Inventors: Fumio Kimura; Takahiro Haga; Nobuyuki Sakashita; Chimoto Honda; Shigeo Murai, all of Kusatsu, Japan

[73] Assignee: Ishihara Sangyo Kaisha Ltd., Osaka, Japan

[21] Appl. No.: 230,395

[22] Filed: Aug. 10, 1988

[30] Foreign Application Priority Data

Aug. 10, 1987 [JP] Japan ..... 62-199287
Jun. 2, 1988 [JP] Japan ..... 63-136043

[51] Int. Cl.[4] ..... A01N 43/48
[52] U.S. Cl. ..... 71/92; 71/93

[56] References Cited

FOREIGN PATENT DOCUMENTS 0232067 1/1987 European Pat. Off. .
0237292 3/1987 European Pat. Off. .
62-178588 5/1987 Japan .

*Primary Examiner*—John F. Terapane
*Assistant Examiner*—Richard Treanor
*Attorney, Agent, or Firm*—Sughrue, Mion, Zinn, Macpeak & Seas

[57] ABSTRACT

Mixtures of herbicidal pyridine sulfonamide compounds of formula:

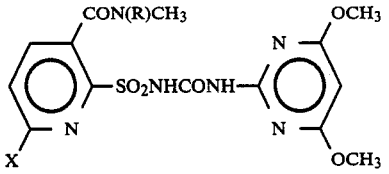

(I)

wherein X is a hydrogen atom, a halogen atom, or a methyl group which may be substituted by 1 to 3 halogen atoms, and R is a hydrogen atom or a methyl group, and their salts, with at least one herbicidal compound selected from the group consisting of 2,4-D, Dicamba, Atrazine, Bentazone, Alcachlor, Metolachlor, Propachlor, Pendimethalin, Tridiphane, Cyanazine, Bromoxynil, Acetochlor, etc.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HERBICIDAL COMPOSITION

BACKGROUND OF THE INVENTION

1. Field of the Invention:

The present invention relates to a herbicidal composition comprising as the effective components at least one compound selected from among pyridinesulfonamide compounds and their salts, and at least one other specific herbicidal compound.

2. Description of the Prior Art:

Japanese patent application No. 62-8286 (published on Aug. 5, 1987 as publication No. KOKAI 62-178588) discloses herbicidal pyridinesulfonamide compounds having the formula:

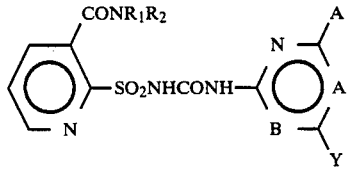

wherein $R_1$ and $R_2$ are a hydrogen atom or an alkyl group, X and Y are a methyl group or a methoxy group, and A is =CH- group or =N- group, and their salts. And this patent application further discloses that the above described pyridinesulfonamide compounds may be mixed with another herbicidal compound, such as 3,6-dichloro-2-methoxybenzoic acid, 3-(1-methylethyl)-lH-2,1,3-benzothiadiazin-4(3H)-one-2,2-dioxide, 2-(4-chloro-6-ethylamino-1,3,5-triazin-2-ylamino)-2-methyl propionitrile, 2-chloro-4-ethylamino-6-isopropylamino-1,3,5-triazine, ethyl 2,4-dichlorophenoxy acetate, 2-(3,5-dichlorophenyl)-2-(2,2,2-trichloroethyl) oxirane, N-(1-ethylpropyl)-2,6-dinitro-3,4-xylidine, 2-chloro-2',6'-diethyl-N-(methoxymethyl)acetanilide, 2-chloro-6'-ethyl-N-(2-methoxy-1-methylethyl)aceto-otoluidide and the like, without showing specific biological test data.

European patent application Nos. 87300502.9 (published on Aug. 12, 1987 as publication No. 232,067) and 87301954.1 (published on Sept. 16, 1987 as publication No. 237,292) also disclose partly that the above described pyridinesulfonamide compounds may be mixed with another herbicidal compound such as those described in Japanese patent application No. 62-8286, without showing specific biological test data.

SUMMARY OF THE INVENTION

The present invention provides a herbicidal composition comprising as the effective components at least one compound selected from among pyridinesulfonamide compounds of formula (I):

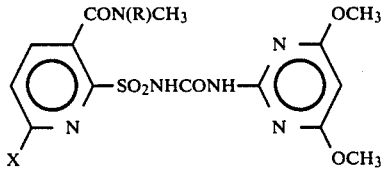

(I)

wherein X is a hydrogen atom, a halogen atom, or a methyl group which may be substituted by 1 to 3 halogen atoms, and R is a hydrogen atom or a methyl group, and their salts, and at least one compound selected from the group consisting of 2,4-dichlorophenoxy acetic acid and its alkylester and salt, 3,6-dichloro-2-methoxybenzoic acid, 2-chloro-4-ethylamino-6-isopropylamino-1,3,5-triazine, 3-(1-methylethyl)-lH-2,1,3-benzothiadiazin-4(3H)-one-2,2-dioxide, 2-chloro-2',6'-diethyl-N-(methoxymethyl)acetanilide, 2-chloro-6'-ethyl-N-(2-methoxy-1-methylethyl)aceto-otoluidide, 2-chloro-N-isopropylacetanilide, N-(1-ethylpropyl)-2,6-dinitro-3,4-xylidine, 2-(3,5-dichlorophenyl)-2-(2,2,2-trichloroethyl-)oxirane, 2-chloro-4-(1-cyano-1-methylethylamino)-6-ethylamino-1,3,5-triazine, methyl 2-[[[4,6-bis-(difluoromethoxy)- pyrimidin-2-yl]aminocarbonyl-]aminosulfonyl]benzoate and its salt, 3,5-dibromo-4hydroxybenzonitrile, 5,7-dimethyl-N-(2,6-dichlorophenyl)-1,2,4-triazolo [1,5-a]pyrimidine-2-sulfonamide, and 2-chloro-N-(ethoxymethyl)-2'-ethyl-6'-methylacetanilide.

The herbicidal composition of the present invention provides a wider weeding spectrum than the use of any individual compound alone, and sufficient weed-killing effect throughout the entire period of growth of corns by spraying only once.

DETAILED DESCRIPTION OF THE PREFERRED EMBODIMENT

In general, many kinds of weeds coexist and grow together but the periods of germination and growth differ from weed to weed. This inevitably results in spraying of a herbicide on many kinds of weeds in different stages of growth. As a matter of fact, it is considerably difficult to kill every weeds by spraying a herbicide thereon only once. If some weeds remain alive, some of them will grow later and others will regerminate even if parts of them above the ground have been killed once, with the result that they will grow thick eventually. In this case, therefore, the effect of spraying a herbicide is halved. Accordingly, there still is a strong demand for development of a herbicide which has a wide weeding spectrum, is effective for fully-grown weeds, and can maintain the weed-controlling effect thereof for a desired period of time.

The instant applicant previously filed a patent application (Japanese Patent Application No. 62-17,323) on the basis of a finding that pyridine-sulfonamide compounds represented by the formula (I) described hereinabove and their salts have a very high weed-killing effect for a wide variety of weeds including highly harmful weeds while showing highly safe levels for corns. However, it sometimes happens that these compounds cannot perfectly exterminate some particular kinds of weeds though it depends on conditions involving the amount and time of application thereof, and that new weeds grow from soil in actual fields after application of any one of these compounds.

As a result of experiments made on combinations of these pyridinesulfonamide compounds of the formula (I) with various herbicidal compounds with a view to solving the above-mentioned problems, the inventors of the present invention have found that the use of a mixture of at least one compound selected from among these pyridinesulfonamide compounds of the formula (I) and their salts with at least one other specific herbicidal compound as will be mentioned later provides a wider weeding spectrum than the use of any individual compound alone, and that a sufficient weed-killing effect can be maintained through the whole period of growth of corns by spraying such a mixture only once.

The present invention has been completed based on these findings.

More specifically, in accordance with the present invention, there is provided a herbicidal composition characterized by comprising as the effective components at least one compound selected from among pyridinesulfonamide compounds represented by the formula (I):

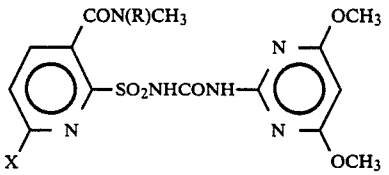

(I)

wherein X is a hydrogen atom, a halogen atom, or a methyl group which may be substituted by 1 to 3 halogen atoms, and R is a hydrogen atom or a methyl group, and their salts, and at least one compound selected from the group consisting of 2,4-dichlorophenoxy acetic acid and its alkylester and salt, 3,6-dichloro-2-methoxybenzoic acid, 2-chloro-4-ethylamino-6-isopropylamino-1,3,5-triazine, 3-(1-methylethyl)-lH-2,1,3-benzothiadiazin-4(3H)-one-2,2-dioxide, 2-chloro-2',6'-diethyl-N-(methoxymethyl)acetanilide, 2-chloro-6'-ethyl-N-(2-methoxy-1-methylethyl)aceto-o-toluidide, 2-chloro-N-isopropylacetanilide, N-(1-ethylpropyl)-2,6-dinitro-3,4-xylidine, 2-(3,5-dichlorophenyl)-2-(2,2,2-trichloroethyl-)oxirane, 2-chloro-4-(1-cyano-1-methylethylamino)-6-ethylamino-1,3,5-triazine, methyl 2-[[[4,6-bis-(difluoromethoxy)-pyrimidin-2-yl]aminocarbonyl-]aminosulfonyl]benzoate and its salt, 3,5-dibromo-4-hydroxybenzonitrile, 5,7-dimethyl-N-(2,6-dichlorophenyl)-1,2,4-triazolo 1,5-a]pyrimidine-2-sulfonamide, and 2-chloro-N-(ethoxymethyl)-2'-ethyl-6'-methylacetanilide.

As the halogen atom as X in the formula (I) or the halogen atom by which the methyl group as X in the formula (I) may be substituted, there can be mentioned a fluorine atom, a chlorine atom, a bromine atom, and an iodine atom.

As the salts of the herbicidal compounds of the present invention, there can be mentioned an alkali metal salt such as sodium or potassium salt, an alkali earth metal salt such as magnesium or calcium salt, an amine salt such as monomethylamine, dimethylamine or triethylamine salt, or a salt of quaternary ammonium base such as trimethylethylammonium cation or tetramethylammonium cation.

Pyridinesulfonamine compounds represented by the formula (I) and their salts include those as shown in the following Table 1.

TABLE 1

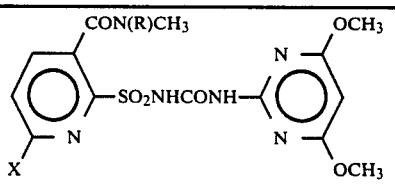

(I)

| Compound No. | X | R | Melting Point (°C.) |
|---|---|---|---|
| A-1 | H | $CH_3$ | 169–173 |
| A-2 | H | H | 147–149.5 |
| A-3 | Cl | $CH_3$ | 183–186 |
| A-4 | Br | $CH_3$ | 201.5–203.5 |

TABLE 1-continued

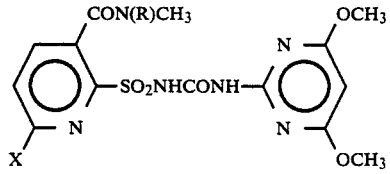

(I)

| Compound No. | X | R | Melting Point (°C.) |
|---|---|---|---|
| A-5 | $CH_3$ | $CH_3$ | 170–174 |
| A-6 | $CHF_2$ | $CH_3$ | 194–195 |
| A-7 | sodium salt of Compound No. A-1 | | 195–215 (decomposition) |
| A-8 | monomethylamine salt of Compound No. A-1 | | 125–128 |

Specific herbicidal compounds which can be used in mixture with the pyridinesulfonamide compounds represented by the formula (I) include those well known under trade names or general terms as will be mentioned in the following Table 2.

TABLE 2

| Compound No. | Name of Compound | Trade Name or General Term |
|---|---|---|
| B-1 | 2,4-dichlorophenoxy acetic acid | 2,4-D |
| B-2 | sodium 2,4-dichlorophenoxy acetate | " |
| B-3 | dimethylammouium 2,4-dichlorophenoxy acetate | " |
| B-4 | ethyl 2,4-dichlorophenoxy acetate | " |
| B-5 | 3,6-dichloro-2-methoxybenzoic acid | Dicamba |
| B-6 | 2-chloro-4-ethylamino-6-isopropylamino-1,3,5-triazine | Atrazine |
| B-7 | 3-(1-methylethyl)-1H—2,1,3-benzothiadiazin-4(3H)—one-2,2-dioxide | Bentazone |
| B-8 | 2-chloro-2',6'-diethyl-N—(methoxymethyl)acetanilide | Alachlor |
| B-9 | 2-chloro-6'-ethyl-N—(2-methoxy-1-methylethyl)aceto-o-toluidide | Metolachlor |
| B-10 | 2-chloro-N—iso-propylacetanilide | Propachlor |
| B-11 | N—(1-ethylpropyl)-2,6-dinitro-3,4-xylidine | Pendimethalin |
| B-12 | 2-(3,5-dichorophenyl)-2-(2,2,2-trichloroethyl)oxirane | Tridiphane |
| B-13 | 2-chloro-4-(1-cyano-1-methylethylamino)-6-ethylamino-1,3,5-triazine | Cyanazine |
| B-14 | methyl 2-[[[4,6-bis-(difluoromethoxy)-pyrimidin-2-yl]aminocarbonyl] aminosulfonyl]benzoate | — |
| B-15 | sodium salt of Compound No. B-14 | — |
| B-16 | 3,5-dibromo-4-hydroxy-benzonitrile | Bromoxynil |
| B-17 | 5,7-dimethyl-N—(2,6-dichloro-phenyl)-1,2,4-triazolo[1,5-a] pyrimidine-2-sulfonamide | — |
| B-18 | 2-chloro-N—(ethoxymethyl)-2'-ethyl-6'-methylacetanilide | Acetochlor |

The mixing ratio (by weight) of the pyridinesulfonamide compound represented by the formula (I) or its salt to the other specific herbicidal compound is generally 1:800 to 200:1, desirably 1:200 to 20:1. The suitable amount of application of the compounds cannot uniquely be determined because it varies depending on the form of preparation, the time of application, the kind of object weed, and the like. In general, however, the amount of the pyridinesulfonamide compound represented by the formula (I) or its salt is about 0.05 to g/a, while the amount of the other specific herbicidal compound is about 0.05 to 40 g/a.

The herbicidal composition of the present invention can be applied to a wide variety of sites including upland fields, orchards, mulberry fields, forests, agricultural roads, grounds, and factory sites. The method of application of the herbicidal composition can be arbitrarily chosen from a soil treatment application and a foliage treatment application.

The herbicidal composition of the present invention is prepared by blending various adjuvants with the pyridinesulfonamide compound of the formula (I) and the other specific herbicidal compound to form an emulsifiable concentrate, a wettable powder, a suspension concentrate, granules, a dust, a water-soluble powder or the like according to any customary method of preparing an agricultural preparation. The pyridinesulfonamide compound of the formula (I) and the other specific herbicidal compound may be either mixed together and formed into a preparation, or formed into separate preparations and then mixed with each other. Examples of the abovementioned adjuvants include solid carriers such as diatomaceous earth, slaked lime, calcium carbonate, talc, white carbon, kaoline, bentonite, jeaklite, water soluble starch, and sodium bicarbonate; solvents such as toluene, xylene, solvent naphtha, ethanol, dioxane, acetone, isophorone, methyl isobutyl ketone, dimethylformamide, dimethylsulfoxide, and N-methyl-2-pyrrolidone; spreaders and surfactants such as sodium alkylsulfates, sodium alkylbenzenesulfonates, sodium lignosulfonate, polyoxyethylene glycol alkyl ethers, polyoxyethylene lauryl ether, polyoxyethylene alkylaryl ethers, polyoxyethylene fatty acid esters, and polyoxyethylene sorbitan fatty acid esters; and vegetable oils and mineral oils such as olive oil, kapok oil, castor oil, papaya oil, camellia oil, coconut oil, sesame oil, corn oil, rice bran oil, peanut oil, cotton seed oil, soybean oil, rape seed oil, linseed oil, tung oil and liquid paraffin.

Description will now be made of examples of formulation of the herbicidal composition of the present invention, which, however, are not limitative.

FORMULATION EXAMPLE 1

| | |
|---|---|
| (1) Compound No. A-1 | 1 part by weight |
| (2) Each of Compound Nos. B-1 to B-18 | 2.5 parts by weight |
| (3) Dikssol W-92 | 2 parts by weight |
| (4) Newlite | 94.5 parts by weight |

The above-mentioned components are mixed and pulverized to obtain a dust.

FORMULATION EXAMPLE 2

| | |
|---|---|
| (1) Compound No. A-1 | 5 parts by weight |
| (2) Each of Compound Nos. B-1 to B-18 | 37.5 parts by weight |
| (3) Dikssol W-66 | 5 parts by weight |
| (4) Dikssol W-0913 | 2 parts by weight |
| (5) diatomaceous earth | 50.5 parts by weight |

The above-mentioned components are mixed to obtain a wettable powder.

FORMULATION EXAMPLE 3

| | |
|---|---|
| (1) Compound No. A-1 | 5 parts by weight |
| (2) Each of Compound Nos. B-1 to B-18 | 50 parts by weight |
| (3) Sorpol 5050 | 3 parts by weight |
| (4) Sorpol 5073 | 4 parts by weight |
| (5) Hi-Filler No. 10 | 38 parts by weight |

The above-mentioned components are mixed to obtain a wettable powder.

FORMULATION EXAMPLE 4

| | |
|---|---|
| (1) Compound No. A-1 | 1 part by weight |
| (2) Each of Compound Nos. B-1 to B-18 | 15 parts by weight |
| (3) Sorpol 5039 | 5 parts by weight |
| (4) Lavelin S | 2 parts by weight |
| (5) Carplex #80 | 15 parts by weight |
| (6) kaoline | 62 parts by weight |

The above-mentioned components are mixed to obtain a wettable powder.

FORMULATION EXAMPLE 5

| | |
|---|---|
| (1) Compound No. A-1 | 0.1 part by weight |
| (2) Each of Compound Nos. B-1 to B-18 | 1 part by weight |
| (3) Dikssol W-92 | 2 parts by weight |
| (4) Newlite | 96.9 parts by weight |

The above-mentioned components are mixed and pulverized to obtain a dust.

FORMULATION EXAMPLE 6

| | |
|---|---|
| (1) Compound No. A-1 | 1 part by weight |
| (2) Each of Compound Nos. B-1 to B-18 | 20 parts by weight |
| (3) Dikssol W-66 | 5 parts by weight |
| (4) Dikssol W-0913 | 2 parts by weight |
| (5) diatomaceous earth | 72 parts by weight |

The above-mentioned components are mixed to obtain a wettable powder.

FORMULATION EXAMPLE 7

| | |
|---|---|
| (1) Compound No. A-1 | 20 parts by weight |
| (2) Each of Compound Nos. B-1 to B-18 | 40 parts by weight |
| (3) Sorpol 5039 | 5 parts by weight |
| (4) Lavelin S | 2 parts by weight |
| (5) kaoline | 33 parts by weight |

The above-mentioned components are mixed to obtain a wettable powder.

FORMULATION EXAMPLE 8

| | |
|---|---|
| (1) Compound No. A-1 | 4 parts by weight |
| (2) Each of Compound Nos. B-1 to B-18 | 30 parts by weight |
| (3) Dikssol W-66 | 5 parts by weight |
| (4) Dikssol W-0913 | 2 parts by weight |
| (5) diatomaceous earth | 59 parts by weight |

The above-mentioned components are mixed to obtain a wettable powder.

FORMULATION EXAMPLE 9

| | |
|---|---|
| (1) Compound No. A-1 | 0.2 part by weight |
| (2) Each of Compound Nos. B-1 to B-18 | 1 part by weight |
| (3) Dikssol W-92 | 2 parts by weight |
| (4) Newlite | 96.8 parts by weight |

The above-mentioned components are mixed and pulverized to obtain a dust.

FORMULATION EXAMPLE 10

| | |
|---|---|
| (1) Compound No. A-7 | 10 parts by weight |
| (2) Compound No. B-2, B-3 or B-15 | 50 parts by weight |
| (3) sodium lignosulfonate | 5 parts by weight |
| (4) water-soluble starch | 35 parts by weight |

The above-mentioned components are mixed to obtain a water-soluble powder.

FORMULATION EXAMPLE 11

| | |
|---|---|
| (1) Compound No. A-1 | 5 parts by weight |
| (2) Each of Compound Nos. B-1 to B-18 | 5 parts by weight |
| (3) Dikssol W-66 | 5 parts by weight |
| (4) Dikssol W-0913 | 2 parts by weight |
| (5) diatomaceous earth | 83 parts by weight |

The above-mentioned components are mixed to obtain a wettable powder.

FORMULATION EXAMPLE 12

| | |
|---|---|
| (1) Compound No. A-5 | 15 parts by weight |
| (2) Each of Compound Nos. B-1 to B-18 | 10 parts by weight |
| (3) Sorpol 5050 | 3 parts by weight |
| (4) Sorpol 5073 | 4 parts by weight |
| (5) Hi-Filler No. 10 | 68 parts by weight |

The above-mentioned components are mixed to obtain a wettable powder.

FORMULATION EXAMPLE 13

| | |
|---|---|
| (1) Compound No. A-1 | 40 parts by weight |
| (2) Each of Compound Nos. B-1 to B-18 | 10 parts by weight |
| (3) Sorpol 5039 | 5 parts by weight |
| (4) Lavelin S | 2 parts by weight |
| (5) Carplex #80 | 15 parts by weight |
| (6) kaoline | 28 parts by weight |

The above-mentioned components are mixed to obtain wettable powder.

FORMULATION EXAMPLE 14

| | |
|---|---|
| (1) Compound No. A-7 | 5 parts by weight |
| (2) Compound No. B-2, B-3 or B-15 | 5 parts by weight |
| (3) sodium lignosulfonate | 5 parts by weight |
| (4) water-soluble starch | 85 parts by weight |

The above-mentioned components are mixed to obtain a water-soluble powder.

FORMULATION EXAMPLE 15

| | |
|---|---|
| (1) Compound No. A-1 | 3 parts by weight |
| (2) Each of Compound Nos. B-1 to B-3, B-5 to B-7 and B-13 to B-18 | 2 parts by weight |
| (3) corn oil | 81 parts by weight |
| (4) Sorpol 3815 | 12 parts by weight |
| (5) bentonite-alkylamine complex | 2 parts by weight |

The above-mentioned components are mixed uniformly and pulverized by Dyno-Mill (Willy A. Bachofen AG) to obtain a suspension concentrate.

[Notes]

Dikssol W-92, W-66 and W-0913, and Lavelin S: trade name of products manufactured by Dai-ichi Kogyo Seiyaku Co., Ltd.

Newlite: trade name of a product manufactured by Nippon Taikagenryo Co., Ltd.

Sorpol 5050, 5073, 5039, 3815: trade name of products manufactured by Toho Chemical Co., Ltd.

Hi-Filler No. 10: trade name of a product manufactured by Matsumura Sangyo Co., Ltd.

Carplex #80: trade name of a product manufactured by Shionogi & Co., Ltd.

As examples of biological tests on the herbicidal composition of the present invention, description will now be made of Test Examples, which, however, are not limitative.

TEST EXAMPLE 1

1/3,000 are (a) pots and 1/10,000 are (a) pots were filled with upland soil. Corn (*Zea mays*) (variety: Royal Dent 105T) was sown in the 1/3,000 are pots, while velvetleaf (*Abutilon theonhrasti*), sicklepod (*Cassia tora*), common lambsquarters (*Chenopodium album*) and large crabgrass (*Digitaria adscendens*) were sown in the 1/10,000 are pots respectively.

When the test plants reached respective given growth stage (a 4.2-leaf stage for corn, a 1.5-leaf stage for velvetleaf, a cotyledon stage for sicklepod, a cotyledon stage to 4-leaf stage for common lambsquarters and a 3-leaf stage for large crabgrass), a predetermined amount of a herbicidal composition which was prepared in the form of a preparation as shown in Formulation Example 7 and diluted in 5 liters, per are (a), of water to prepare an aqueous solution to which an agricultural spreader was then added in an amount of 0.2% by volume based on the total, was foliarly applied to the plants with a small spray gun. The progress of growth of the plants was visually observed 30 days after the application to evaluate the degree of growth control according to 10 ratings (1: the same as in an untreated plot—10: perfect growth control). The results are shown in Table 3.

TABLE 3

| Mixing Partner Compound and Amount Thereof (g/a) | | Compound No. A-1 and Amount Thereof (g/a) Degree of Growth Control Subject Plants | | | | | | | | | | | | | | |
|---|---|---|---|---|---|---|---|---|---|---|---|---|---|---|---|---|
| | | corn | | | velvetleaf | | | sicklepod | | | common lambsquarters | | | large crabgrass | | |
| | | 1.25 | 0.625 | 0 | 1.25 | 0.625 | 0 | 1.25 | 0.625 | 0 | 1.25 | 0.625 | 0 | 1.25 | 0.625 | 0 |
| | 2.5 | — | 3 | 1 | — | 7 | 6 | — | — | — | — | — | — | — | — | — |
| B-5 | 1.25 | — | 2 | 1 | — | 7 | 6 | — | 10 | 8 | — | — | — | — | — | — |
| | 0 | — | — | — | — | — | — | — | — | — | — | — | — | — | — | — |
| | 15.0 | 1 | 1 | 1 | 10 | 10 | 8 | 9 | 8 | 9 | — | — | — | — | — | — |
| B-6 | 7.5 | 1 | 1 | 1 | 10 | 9 | 6 | 8 | 8 | 8 | — | — | — | — | — | — |
| | 0 | 1 | 1 | 1 | 7 | 6 | 1 | 8 | 7 | 1 | — | — | — | — | — | — |
| | 10.0 | 2 | 1 | 1 | 10 | 10 | 10 | — | — | — | — | — | — | — | — | — |
| B-7 | 5.0 | — | 1 | 1 | 10 | 10 | 10 | — | — | — | — | — | — | — | — | — |
| | 0 | — | — | — | — | — | — | — | — | — | — | — | — | — | — | — |
| | 15.0 | 3 | 2 | 1 | — | — | — | — | — | — | 10 | 10 | 1 | 10 | 10 | 5 |
| B-8 | 7.5 | 2 | 2 | 1 | — | — | — | — | — | — | 10 | 10 | 1 | 10 | 9 | 1 |
| | 0 | 1 | 1 | 1 | — | — | — | — | — | — | 10 | 9 | 1 | 10 | 8 | 1 |
| | 10.0 | 1 | 1 | 2 | — | — | — | — | — | — | 10 | 10 | 1 | — | — | — |
| B-9 | 5.0 | 1 | 1 | 1 | — | — | — | — | — | — | 10 | 10 | 1 | — | — | — |
| | 0 | — | — | — | — | — | — | — | — | — | — | — | — | — | — | — |
| | 20.0 | 2 | 1 | 1 | — | — | — | — | — | — | 10 | 10 | 4 | 10 | 10 | 1 |
| B-10 | 10.0 | 1 | 1 | 1 | — | — | — | — | — | — | 10 | 10 | 4 | 10 | 9 | 1 |
| | 0 | — | — | — | — | — | — | — | — | — | — | — | — | — | — | — |
| | 10.0 | 2 | 2 | 1 | 8 | 7 | 7 | — | — | — | — | — | — | — | — | — |
| B-11 | 5.0 | 2 | 1 | 1 | 7 | 7 | 6 | — | — | — | — | — | — | — | — | — |
| | 0 | — | — | — | — | — | — | — | — | — | — | — | — | — | — | — |
| | 5.0 | 1 | 1 | 1 | — | — | — | — | — | — | 10 | 10 | 3 | — | — | — |
| B-12 | 2.5 | 1 | 1 | 1 | — | — | — | — | — | — | 10 | 10 | 3 | — | — | — |
| | 0 | — | — | — | — | — | — | — | — | — | — | — | — | — | — | — |

TEXT EXAMPLE 2

1/3,000 are (a) pots and 1/10,000 are (a) pots were filled with upland soil. Corn (variety: Royal Dent 105T) was sown in the 1/3,000 are pots, while velvetleaf, sicklepod and common lambsquarters were sown in the 1/10,000 are pots respectively.

When the test plants reached respective given growth stage (a 4.2-leaf stage for corn, a 2.5-leaf stage for velvetleaf, a 1.2-leaf stage for sicklepod and a 2 to 4-leaf stage for common lambsquarters), a predetermined amount of a herbicidal composition which was diluted in 5 liters, per are (a), of water to prepare an aqueous solution to which an agricultural spreader was then added in an amount of 0.2% by volume based on the total, was foliarly applied to the plants with a small spray gun. The progress of growth of the plants was visually observed 26 days after the application to evaluate the degree of growth control according to 10 ratings (1: the same as in an untreated plot - 10: perfect growth control). The results are shown in Table 4.

TABLE 4

| Mixing Partner Compound and Amount Thereof (g/a) | | Compounds No. A-1 and Amount Thereof (g/a) Degree of Growth Control Subject Plants | | | | | | | | | | | |
|---|---|---|---|---|---|---|---|---|---|---|---|---|---|
| | | corn | | | | velvetleaf | | | | sicklepod | | | |
| | | 1.25 | 0.625 | 0.312 | 0 | 1.25 | 0.625 | 0.312 | 0 | 1.25 | 0.625 | 0.312 | 0 |
| | 4 | 2 | 2 | 2 | 2 | 10 | 10 | 10 | 10 | 10 | 9 | 9 | 9 |
| B-3 | 2 | 2 | 2 | 2 | 2 | 10 | 10 | 9 | 10 | 8 | 8 | 7 | 7 |
| | 1 | 2 | 2 | 2 | 2 | 9 | 8 | 8 | 8 | 7 | 7 | 7 | 5 |
| | 0 | 1 | 1 | 1 | — | 7 | 6 | 6 | — | 7 | 7 | 4 | — |
| | 4 | 1 | 1 | 1 | 1 | 8 | 6 | 6 | 5 | 9 | 6 | 7 | 3 |
| B-13 | 2 | 1 | 1 | 1 | 1 | 8 | 6 | 6 | 4 | 8 | 7 | 5 | 2 |
| | 1 | 1 | 1 | 1 | 1 | 7 | 6 | 6 | 4 | 8 | 7 | 5 | 1 |
| | 0 | 1 | 1 | 1 | 1 | 7 | 6 | 6 | — | 7 | 7 | 4 | — |

| Mixing Partner Compound and Amount Thereof (g/a) | | Compound No. A-1 and Amount Thereof (g/a) Degree of Growth Control Subject Plants common lambsquarters | | | |
|---|---|---|---|---|---|
| | | 1.25 | 0.625 | 0.312 | 0 |
| | 4 | 10 | 10 | 10 | 10 |
| B-3 | 2 | 10 | 10 | 10 | 10 |
| | 1 | 10 | 10 | 10 | 10 |
| | 0 | 7 | 6 | 5 | — |
| | 4 | 10 | 10 | 10 | 10 |
| B-13 | 2 | 10 | 10 | 10 | 10 |
| | 1 | 9 | 9 | 9 | 9 |
| | 0 | 7 | 6 | 5 | — |

TEST EXAMPLE 3

1/1,500 are (a) pots were filled with upland soil. Corn (variety: Royal Dent 105T), cocklebur (*Xanthium strumarium*), morningglory (*Ipomoea purpurea*), prickly sida (*Sida spinosa*), Pigweed (*Amaranthus retroflexus*) and barnyard grass (*Echinochloa crusgalli*) were sown in the pots.

When the test plants reached respective given growth stage (a 2.5-leaf stage for corn, a 1.5-leaf stage for cocklebur, a 2.0-leaf stage for morningglory, a 1.0-leaf stage for prickly sida and pigweed, and a 1.5-leaf stage for barnyard grass), a predetermined amount of a herbicidal composition which was diluted in 5 liters, per are (a), of water to prepare an aqueous solution to which an agricultural spreader was then added in an amount of 0.2% by volume based on the total, was foliarly applied to the plants with a small spray gun. The progress of growth of the plants was visually observed 14 days after the application to evaluate the degree of growth control according to 10 ratings (1: the same as in an untreated plot—10: perfect growth control). The results are shown in Table 5.

TABLE 5

| Mixing Partner Compound and Amount Thereof (g/a) | | Compound No. A-1 and Amount Thereof (g/a) Degree of Growth Control Subject Plants | | | | | | | | |
|---|---|---|---|---|---|---|---|---|---|---|
| | | corn | | | cocklebur | | | morningglory | | |
| | | 0.3 | 0.15 | 0 | 0.3 | 0.15 | 0 | 0.3 | 0.15 | 0 |
| B-14 | 0.3 | 1 | 1 | 1 | 10 | 10 | 9 | 7 | 6 | 6 |
| | 0.15 | 1 | 1 | 1 | 9 | 9 | 9 | 7 | 6 | 5 |
| | 0 | 1 | 1 | — | 9 | 8 | — | 6 | 6 | — |

| Mixing Partner Compound and Amount Thereof (g/a) | | Compound No. A-1 and Amount Thereof (g/a) Degree of Growth Control Subject Plants | | | | | | | | |
|---|---|---|---|---|---|---|---|---|---|---|
| | | prickly sida | | | pigweed | | | barnyard grass | | |
| | | 0.3 | 0.15 | 0 | 0.3 | 0.15 | 0 | 0.3 | 0.15 | 0 |
| B-14 | 0.3 | 7 | 6 | 7 | 10 | 10 | 10 | 10 | 10 | 1 |
| | 0.15 | 6 | 6 | 6 | 10 | 10 | 10 | 10 | 10 | 1 |
| | 0 | 6 | 5 | — | 10 | 10 | — | 9 | 7 | — |

What is claimed is:

1. A herbicidal composition characterized by comprising as the effective components at least one compound selected from among pyridinesulfonamide compounds represented by the formula (I):

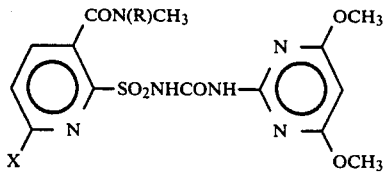

(I)

wherein X is a hydrogen atom, a halogen atom, or a methyl group which may be substituted by 1 to 3 halogen atoms, and R is a hydrogen atom or a methyl group, and their salts, and at least one compound selected from the group consisting of 2,4-dichlorophenoxy acetic acid and its alkylester and salt, 3,6-dichloro-2-methoxybenzoic acid, 2-chloro-4-ethylamino-6-isopropylamino-1,3,5-triazine, 3-(1-methylethyl)-lH-2,1,3-benzothiadiazin-4(3H)-one-2,2-dioxide, 2-chloro-2′,6′-diethyl-N-(methoxymethyl)acetanilide, 2-chloro-6′-ethyl-N-(2-methoxy-1-methylethyl)aceto-o-toluidide, 2-chloro-N-isopropylacetanilide, N-(1-ethylpropyl)-2,6-dinitro-3,4-xylidine, 2-(3,5-dichlorophenyl)-2-(2,2,2-trichloroethyl-)oxirane, 2-chloro-4-(1-cyano-1-methylethylamino)-6-ethylamino-1,3,5-triazine, methyl 2-[[[4,6-bis-(difluoromethoxy)-pyrimidin-2-yl]aminocarbonyl-]aminosulfonyl]benzoate and its salt, 3,5-dibromo-4-hydroxybenzonitrile, 5,7-dimethyl-N-(2,6-dichlorophenyl)-1,2,4-triazolo [1,5-a]pyrimidine-2-sulfonamide, and 2-chloro-N-(ethoxymethyl)-2′-ethyl-6′-methylacetanilide.

2. A herbicidal composition as claimed in claim 1, wherein the effective components are at least one compound selected from among pyridinesulfonamide compounds represented by the formula (I) and their salts, and at least one compound selected from the group consisting of dimethylammonium 2,4-dichlorophenoxyacetate, 3,6-dichloro-2-methoxybenzoic acid, 2-chloro-4-ethylamino-6-isopropylamino-1,3,5-triazine, 3-(1-methylethyl)-lH-2,1,3-benzothiadiazin-4(3H)-one-2,2-dioxide, 2-chloro-2′,6′-diethyl-N-(methoxymethyl-)acetanilide, 2-chloro-6′-ethyl-N-(2-methoxy-1-methylethyl)aceto- o-toluidide, 2-chloro-N-isopropylacetanilide, N-(1-ethylpropyl)-2,6-dinitro-3,4-xylidine, 2-(3,5-dichlorophenyl)-2-(2,2,2-trichloroethyl-)oxirane, and 2-chloro-4-(1-cyano-1-methylethylamino)-6-ethylamino-1,3,5-triazine.

3. A herbicidal composition as claimed in claim 1, wherein the effective components are at least one compound selected from among pyridinesulfonamide compounds represented by the formula (II):

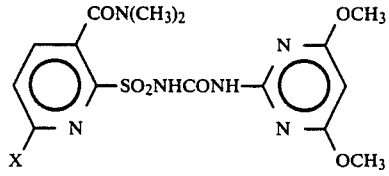

(II)

wherein X is a hydrogen atom or a methyl group, and their salts, and methyl 2-[[[4,6-bis-(difluoromethoxy)-pyrimidin-2-yl]aminocarbonyl]aminosulfonyl]benzoate and its salt.

* * * * *